No. 738,887. PATENTED SEPT. 15, 1903.
H. L. DE ZENG.
OPHTHALMOSCOPE.
APPLICATION FILED JUNE 3, 1901.
NO MODEL.
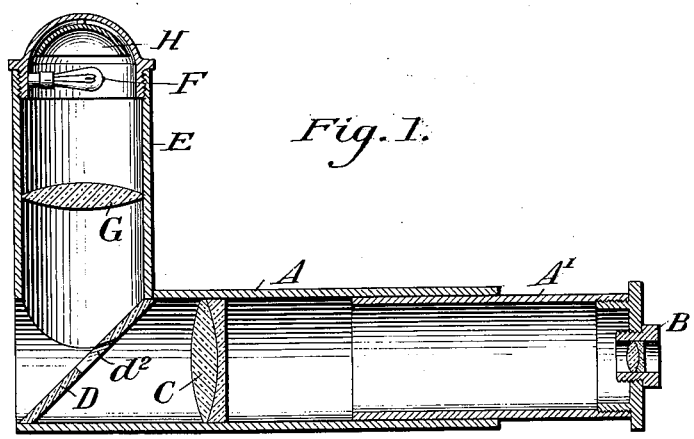
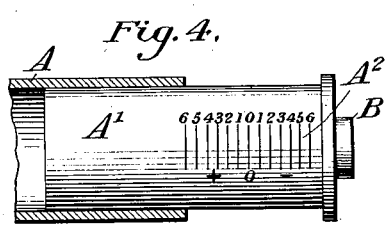
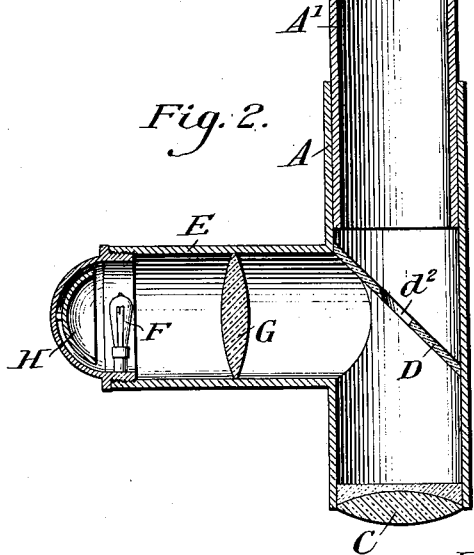
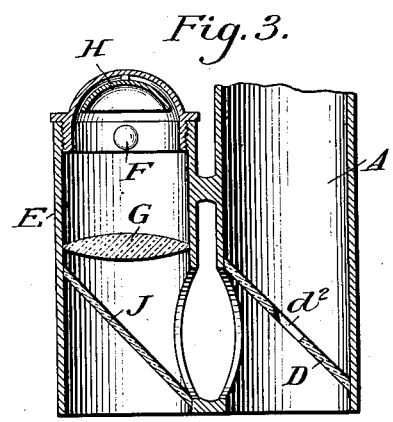
Witnesses: Inventor:
Henry L. De Zeng No. 738,887. Patented September 15, 1903.

UNITED STATES PATENT OFFICE.

HENRY L. DE ZENG, OF PHILADELPHIA, PENNSYLVANIA, ASSIGNOR TO A. M. DE ZENG, OF PHILADELPHIA, PENNSYLVANIA, AND WALTER H. CHAMBERLIN, OF CHICAGO, ILLINOIS.

OPHTHALMOSCOPE.

SPECIFICATION forming part of Letters Patent No. 738,887, dated September 15, 1903.

Application filed June 3, 1901. Serial No. 62,931. (No model.)

*To all whom it may concern:*

Be it known that I, HENRY L. DE ZENG, a citizen of the United States, residing at Philadelphia, State of Pennsylvania, have invented a certain new and useful Improvement in Ophthalmoscopes; and I declare the following to be a full, clear, and exact description of the invention, such as will enable others skilled in the art to which it pertains to make and use the same, reference being had to the accompanying drawings, which form a part of this specification.

My invention relates to certain improvements in connection with an invention of mine the application for which was filed April 29, 1901, Serial No. 57,901. In the said application I have shown and described the employment of a telescope in connection with the reflector of an ophthalmoscope for the purpose of magnifying and observing the retina of the eye.

My present invention relates to the provision, in connection with the instrument just described, of means whereby the instrument itself will carry a source of illuminating-rays, so that the operator is not obliged to adjust the eye to be inspected and himself with relation to the source of light, but will always have his illumination in a fixed relation to the ophthalmoscope and telescope.

In the drawings, Figure 1 is a longitudinal horizontal section of my device. Fig. 2 is a similar view of a variation; Fig. 3, a similar view of another variation; Fig. 4, a side elevation of a portion. Fig. 5 illustrates a variation in the form of the objective-lens.

A represents the tube of the telescope; B, the eyepiece, preferably mounted in a separate tube A', which is adjustable with relation to the tube A; C, the objective; D, the reflector of the ophthalmoscope, and $d^2$ the orifice therethrough in line with the optical axis of the telescope. The reflector, it will be observed, is placed at an angle of forty-five degrees with said axis.

Extending from the casing A of the telescope and either made integral therewith or attached thereto is a casing E, adapted to contain a suitable electric lamp F or other suitable source of light.

G is a lens located in the casing E between the light F and reflector D and acting as a condenser. This lens may or may not be used, as desired.

Behind the light F is a reflector H, which may or may not be used, as desired.

On the tube A' may, if desired, be placed graduations $A^2$ to indicate the relative adjustment of the telescope-lenses.

The operation of the instrument will now be understood. The rays from the light F are reflected by the reflector D into the eye to be examined, thus illuminating the retina thereof. The rays from the examined eye pass through the opening $d$ and through the telescopic lenses to the operator's eye, thus giving a clear view of the object. By having the light F always in a fixed relation to the telescope and ophthalmoscope the only relative positions to be fixed by the operator are those between himself and the examined eye. Of course the casing E may be fixed at any other desired angle with respect to the casing A and the angle of the reflector changed accordingly without departing from the invention. Again, the casing E, containing the light F, might be arranged parallel with the telescope A or arranged to form an acute angle with the telescope, in which case an intermediate reflector J, Fig. 3, or a refracting-prism may be employed, or, as shown in Fig. 2, the arrangement of the parts might be altered so that the reflector D may be located between the eyepiece and objective of the telescope and the casing E, containing the light, be located accordingly. Again, the form of the objective-lens may be varied without departing from the invention—as, for instance, as shown in Fig. 5, where the objective is a double-concave lens.

While I have herein described the invention as being the combination with an ophthalmoscope of a telescope, yet it is obvious that an adjustment of the relative positions of the eyepiece and objective would make a microscope of it.

What I claim is—

1. An article of manufacture combining an ophthalmoscope and a magnifying apparatus, comprising a case provided with an eyepiece and object-lens, adjustable with respect to each other; a source of artificial light carried by the case, and a reflector located in the telescopic axis of the eyepiece and object-lens; said reflector having means permitting the transmission of light from the object through said reflector and adapted to reflect the rays of the artificial light against the object, substantially as described.

2. An article of manufacture combining a magnifying apparatus and an ophthalmoscope, consisting of a case having two portions, one at an angle with the other; one portion containing the telescopic eyepiece and lens; the other portion containing a source of artificial light and a reflector having means permitting the transmission of light from the object through said reflector; said reflector located at the junction of the two portions of the case and adapted to reflect the light from the artificial source to the object.

In testimony whereof I sign this specification in the presence of two witnesses.

HENRY L. DE ZENG.

Witnesses:
J. ARCHIBALD MURRAY,
CHARLES H. HANSON.